(12) United States Patent
Shaarawi et al.

(10) Patent No.: US 12,121,973 B2
(45) Date of Patent: Oct. 22, 2024

(54) THREE-DIMENSIONAL (3D) PRINTING

(71) Applicant: Hewlett-Packard Development Company, L.P., Spring, TX (US)

(72) Inventors: Mohammed S. Shaarawi, Corvallis, OR (US); James McKinnell, Corvallis, OR (US); Vladek Kasperchik, Corvallis, OR (US); David A. Champion, Corvallis, OR (US); Greg Scott Long, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/125,042

(22) Filed: Mar. 22, 2023

(65) Prior Publication Data
US 2023/0219137 A1 Jul. 13, 2023

Related U.S. Application Data

(62) Division of application No. 16/073,173, filed as application No. PCT/US2016/028319 on Apr. 19, 2016, now Pat. No. 11,633,782.

(51) Int. Cl.
| | | |
|---|---|---|
| *B22F 12/63* | (2021.01) | |
| *B22F 1/10* | (2022.01) | |
| *B22F 1/107* | (2022.01) | |
| *B22F 9/04* | (2006.01) | |
| *B22F 10/14* | (2021.01) | |
| *B22F 10/20* | (2021.01) | |
| *B22F 10/64* | (2021.01) | |
| *B29C 64/165* | (2017.01) | |
| *B29C 67/00* | (2017.01) | |
| *B33Y 10/00* | (2015.01) | |
| *B33Y 30/00* | (2015.01) | |
| *B33Y 40/00* | (2020.01) | |
| *B33Y 40/20* | (2020.01) | |
| *B33Y 70/00* | (2020.01) | |
| *B22F 10/28* | (2021.01) | |
| *B22F 10/32* | (2021.01) | |
| *B22F 10/50* | (2021.01) | |
| *B22F 12/52* | (2021.01) | |
| *B22F 12/67* | (2021.01) | |
| *B33Y 70/10* | (2020.01) | |

(52) U.S. Cl.
CPC ............. *B22F 9/04* (2013.01); *B22F 1/10* (2022.01); *B22F 1/107* (2022.01); *B22F 10/14* (2021.01); *B22F 10/20* (2021.01); *B22F 10/64* (2021.01); *B29C 64/165* (2017.08); *B29C 67/00* (2013.01); *B33Y 10/00* (2014.12); *B33Y 30/00* (2014.12); *B33Y 40/00* (2014.12); *B33Y 40/20* (2020.01); *B33Y 70/00* (2014.12); *B22F 2009/041* (2013.01); *B22F 10/28* (2021.01);

*B22F 10/32* (2021.01); *B22F 10/50* (2021.01); *B22F 12/52* (2021.01); *B22F 12/63* (2021.01); *B22F 12/67* (2021.01); *B33Y 70/10* (2020.01)

(58) Field of Classification Search
CPC ........................................................ B22F 12/63
See application file for complete search history.

(56) References Cited

U.S. PATENT DOCUMENTS

| | | |
|---|---|---|
| 6,582,651 B1 | 6/2003 | Cochran, Jr. et al. |
| 6,730,178 B2 | 5/2004 | Miyamoto et al. |
| 6,992,018 B2 | 1/2006 | Watkins et al. |
| 8,509,933 B2 | 8/2013 | Steingart et al. |
| 2002/0031603 A1 | 3/2002 | Miyamoto et al. |
| 2002/0105114 A1 | 8/2002 | Kubo et al. |
| 2002/0189405 A1 | 12/2002 | Liu et al. |
| 2005/0079086 A1 | 4/2005 | Farr et al. |
| 2006/0045787 A1 | 3/2006 | Jandeska et al. |
| 2007/0160899 A1 | 7/2007 | Atanassova et al. |
| 2007/0238056 A1 | 10/2007 | Baumann et al. |
| 2007/0241482 A1 | 10/2007 | Giller et al. |
| 2009/0007724 A1 | 1/2009 | Liu |
| 2015/0056426 A1 | 2/2015 | Grouchko et al. |
| 2015/0093279 A1 | 4/2015 | Kington et al. |
| 2018/0272427 A1 | 9/2018 | Erickson et al. |

FOREIGN PATENT DOCUMENTS

| | | |
|---|---|---|
| CN | 105081306 A | 11/2015 |
| EP | 1524049 A2 | 4/2005 |
| WO | 00/76698 A1 | 12/2000 |
| WO | 2015/112365 A1 | 7/2015 |

OTHER PUBLICATIONS

Gibson, et al., Additive Manufacturing Technologies, Springer, 2010.*
Gibson et al., "Powder Bed Fusion Processes," Additive Manufacturing Technologies, Springer, 2010, pp. 103-142.

* cited by examiner

Primary Examiner — Christopher S Kessler
(74) Attorney, Agent, or Firm — Dierker & Kavanaugh, P.C.

(57) ABSTRACT

In a three-dimensional printing method example, a liquid functional agent is selectively applied. The liquid functional agent includes an alloying agent. A metallic build material is applied. The liquid functional agent is selectively applied before the metallic build material, after the metallic build material, or both before and after the metallic build material. The liquid functional agent patterns the metallic build material to form a composite layer. At least some of the metallic build material is exposed to energy to melt the at least some of the metallic build material to form a layer. Upon contact or after energy exposure, the alloying agent and the build material alter a composition of the composite layer.

8 Claims, 2 Drawing Sheets

THREE-DIMENSIONAL (3D) PRINTING

CROSS REFERENCE TO RELATED APPLICATIONS

This application is a divisional of U.S. application Ser. No. 16/073,173, filed Jul. 26, 2018 (now U.S. Pat. No. 11,633,782, issued Apr. 25, 2023), which itself is a 371 National Stage Entry of International Application No. PCT/US2016/028319, filed Apr. 19, 2016, each of which is incorporated herein by reference in its entirety.

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

Inkjet printing has also been used to print liquid functional agents in three-dimensional (3D) printing. 3D printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. 3D printing often requires curing or fusing of the building material, which for some materials may be accomplished using heat-assisted extrusion, melting, or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
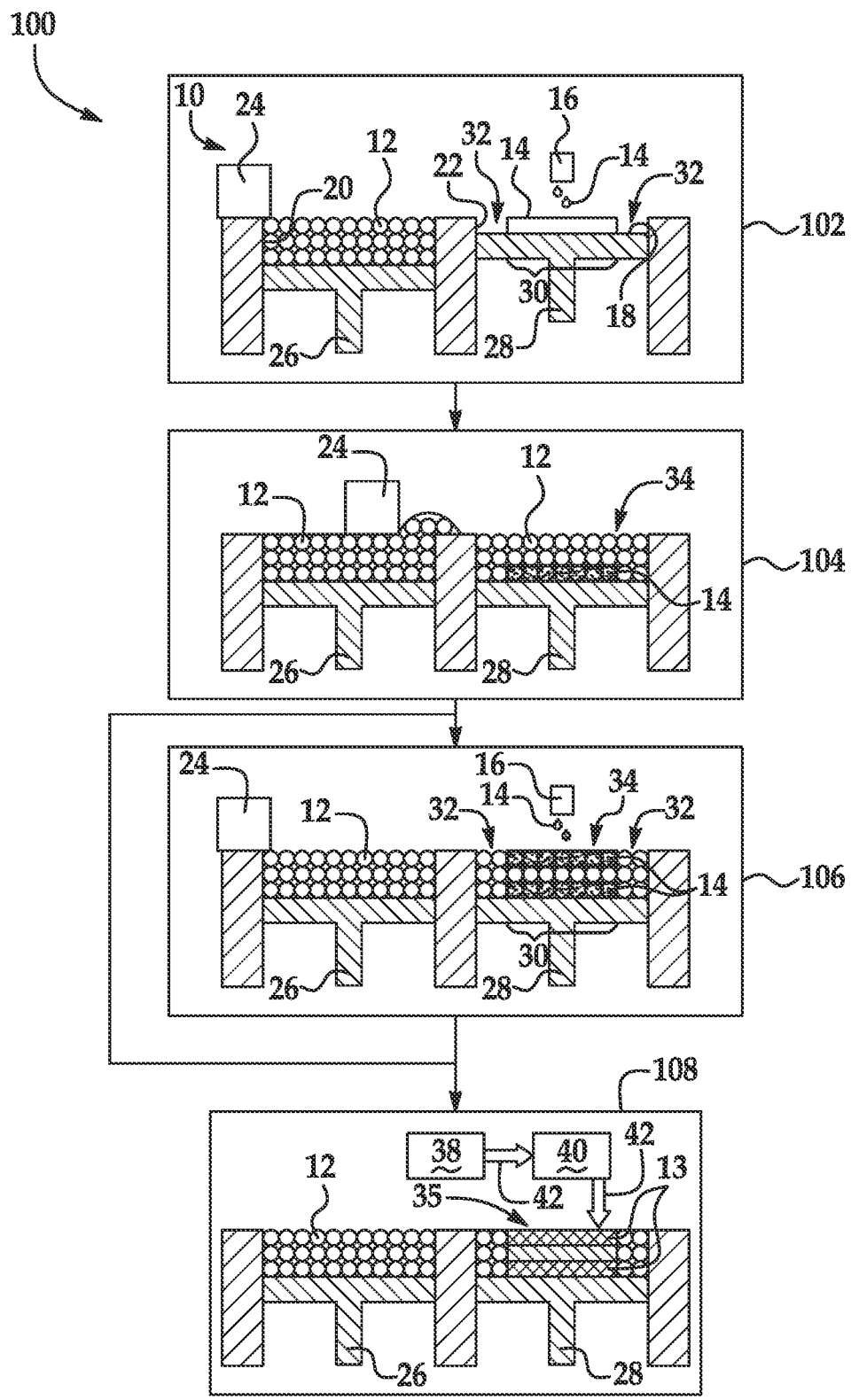
FIG. 1 is a flow diagram illustrating an example of a 3D printing method disclosed herein.

Some examples of the three-dimensional (3D) printing method and the 3D printing system disclosed herein utilize Selective Laser Melting (SLM). During Selective Laser Melting, a laser beam is aimed at a selected region (in some instances less than the entire layer) of a layer of a build material (also referred to as build material particles). Heat from the laser beam causes the build material under the laser beam to melt. This causes the build material to fuse, bind, cure, etc. to form the layer of the 3D part.

Examples of the 3D printing method and 3D printing system disclosed herein utilize a liquid functional agent that contains an alloying agent which may be dispersed in an aqueous or non-aqueous vehicle. The alloying agent may be an elemental metal (also referred to herein as an alloying element) that is capable of forming an alloy with the build material. The alloying agent may also be an alloying element precursor, which undergoes a reaction (or series of reactions) to liberate an alloying element (e.g., elemental metal), which then forms an alloy with the build material.

In the examples of the method disclosed herein, the liquid functional agent is used to pattern at least a portion of the build material to form a composite layer. Either through spontaneously alloying or energy-induced alloying, the combination of the alloying agent and the build material alters the composition of the composite layer by forming an alloy.

In some examples of the method disclosed herein, upon exposure to the build material, the alloying agent is capable of spontaneously alloying with the build material. Depending upon the alloying agent and the build material being used, this spontaneous alloying may take place at room temperature, or may involve an exothermic reaction that generates enough heat to locally melt the metals. In these instances, the 3D printing method may not involve exposing the composite layer to any additional energy in order to form the 3D part. Alternatively, in these instances, additional energy exposure may be used to ensure melting of the composite layer to form the 3D part.

In other examples of the method disclosed herein, upon exposure to energy, the alloying agent is capable of alloying with the build material. In these examples, the energy initiates the alloying of the alloying agent with the build material. The formation of the alloy alters the composition of the composite layer (created from the build material and some components of the liquid functional agent).

In still other examples of the method disclosed herein, upon exposure to energy, the alloying agent is capable of undergoing one or more reactions in order to liberate an alloying element, which is capable of alloying with the build material to form an alloy.

In each of the examples disclosed herein, the alloying agent functions to alter the composition, and thus the localized properties of the part that is formed, not to bind the build material particles together.

The liquid functional agent may be jetted onto the build material in discrete amounts (e.g., 1-5 ng). This selective application of the liquid functional agent allows for voxel level control over the composition and physical properties of the 3D part. The alloying agent changes the composition of the build material which changes the kinetics and thermodynamics of reactions during the formation of a 3D printed part. Additionally, the reaction that the alloying agent may undergo may be either an exothermic reaction that supplies additional heat to the build material or an endothermic reaction that removes/consumes heat, further changing the kinetics and thermodynamics of reactions during the formation of the 3D printed part. Because discrete amounts of the liquid functional agent may be jetted onto selective portions of the build material, control over composition, phase nucleation and growth, morphology, microstructure, and grain size may be localized throughout the 3D printed part, and physical properties of the 3D printed part, such as hardness, ultimate tensile strength, elastic modulus, electrical conductivity, and surface finish, may be customized on the voxel scale.

As used herein, the terms "3D printed part," "3D part," or "part" may be a completed 3D printed part or a layer of a 3D printed part.

The 3D printing method 100 shown in FIG. 1 utilizes the liquid functional agent 14 disclosed herein. In some examples, the liquid functional agent 14, which includes an alloying agent, does not include an energy absorber. In the examples disclosed herein, the alloying agent may absorb a sufficient amount of energy in order to initiate alloying of the agent with the build material 12, or to initiate another reaction that liberates the alloying element which alloys with the build material 12. The energy may be directly applied by an energy source 38, or it may be energy transferred from a build material 12 which absorbs the energy applied by the energy source 38. As such, the alloying element precursor does not function as a typical energy absorber, which absorbs a significant amount of the applied energy and converts the applied energy to heat, which is then transferred to the surrounding build material 12.

The liquid functional agent 14 is a liquid, and may be included in a single cartridge set or a multiple-cartridge set. In the multiple-cartridge set, any number of the multiple dispersions may have an alloying agent incorporated therein.

In one example, the liquid functional agent 14 disclosed herein includes a liquid vehicle and the alloying agent. In some examples, the liquid functional agent 14 consists of these components with no other components. In other examples, the liquid functional agent 14 may include the alloying agent with no other components. For example, when the alloying agent is a hydrocarbon or a low melting point metal, such as Sn, Pb, Bi, Ga, In, and Zn, the liquid functional agent 14 may include the alloying agent with no other components, in part because these materials may be jetted using piezoelectric inkjet printheads.

As used herein, "liquid vehicle," and "vehicle" may refer to the liquid fluid in which the alloying agent is placed to form the liquid functional agent 14. A wide variety of vehicles may be used with the liquid functional agent 14 and methods of the present disclosure. The vehicle may include water alone, a master solvent alone, or water or a master solvent in combination with a mixture of a variety of additional components. Examples of these additional components may include organic co-solvent(s), surfactant(s), antimicrobial agent(s), anti-kogation agent(s) (for thermal inkjet formulations), and/or chelating agent(s). One example vehicle includes water, co-solvent(s), and surfactant(s). In any of the examples disclosed herein, the co-solvent(s) may be used to improve reliability, nozzle health, and decap performance (i.e., the ability of the fluid to readily eject from a printhead, upon prolonged exposure to air), and the surfactant(s) may be used to quickly wet the build material 12.

The water-based or master solvent-based vehicle may include an organic co-solvent present, in total in the liquid functional agent 14, in an amount ranging from about 1 wt % to about 50 wt % (based on the total wt % of the liquid functional agent 14), depending, at least in part, on the jetting architecture. In an example, the co-solvent is present in the liquid functional agent 14 in an amount of about 10 wt % based on the total wt % of the liquid functional agent 14. It is to be understood that other amounts outside of this example and range may also be used. Examples of suitable co-solvents include high-boiling point solvents (some of them may also have a humectant functionality), which have a boiling point of at least 120° C. Classes of organic co-solvents that may be used include aliphatic alcohols, aromatic alcohols, diols, glycol ethers, polyglycol ethers, 2-pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the vehicle may include 1-(2-hydroxyethyl)-2-pyrrolidone.

As mentioned above, the vehicle may also include surfactant(s). Any water-soluble surfactant may be used for the water-based vehicle, and any surfactant that is soluble in the master solvent may be used for the master solvent-based vehicle. As an example, the liquid functional agent 14 may include non-ionic, cationic, and/or anionic surfactants, which may be present in an amount ranging from about 0.01 wt % to about 5 wt % based on the total wt % of the liquid functional agent 14. In at least some examples, the vehicle may include a silicone-free alkoxylated alcohol surfactant such as, for example, TEGO® Wet 510 (EvonikTegoChemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylatedacetylenic diol), SURFYNOL® CT-211 (now CARBOWET® GA-211, non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont); TERGITOL® TMN-3 and TERGITOL® TMN-6 (both of which are branched secondary alcohol ethoxylate, non-ionic surfactants), and TERGITOL® 15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Co.).

The vehicle may also include antimicrobial agent(s). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, ACTICIDE® M20 (Thor), and combinations thereof. In an example, the liquid functional agent 14 may include a total amount of antimicrobial agents that ranges from about 0.1 wt % to about 0.25 wt %.

When the liquid functional agent 14 is to be applied via thermal inkjet applications, an anti-kogation agent may also be included in the vehicle. Kogation refers to the deposit of dried ink on a heating element of a thermal inkjet printhead. Anti-kogation agent(s) is/are included to assist in preventing the buildup of kogation. Examples of suitable anti-kogation agents include oleth-3-phosphate (commercially available as CRODAFOS™ O3A or CRODAFOS™ N-3 acid) or dextran 500 k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the liquid functional agent 14 in an amount ranging from about 0.1 wt % to about 1 wt % of the total wt % of the liquid functional agent 14.

The vehicle may also include a chelating agent. Examples of suitable chelating agents include disodium ethylenediaminetetraacetic acid (EDTA-Na) and methylglycinediacetic acid (e.g., TRILON® M from BASF Corp.). Whether a single chelating agent is used or a combination of chelating agents is used, the total amount of chelating agent(s) in the liquid functional agent 14 may range from 0 wt % to about 1 wt % based on the total wt % of the liquid functional agent 14.

The balance of the vehicle is water or a master solvent. As such, the amount of water or master solvent may vary depending upon the weight percent of the other liquid functional agent components.

In an example, the water is deionized water.

Examples of the master solvent may be water-soluble solvents or non-aqueous solvents, such as lower polarity solvents or non-polar solvents. Examples of water-soluble solvents with polar groups include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the master solvent may be 1-(2-hydroxyethyl)-2-pyrrolidone. In other cases, the master solvent may be based on lower polarity or non-polar solvents, both of which have poor water solubility. Examples of lower polarity or non-polar solvents include aliphatic, cyclic aliphatic or aromatic hydrocarbons. Water insoluble fatty alcohols, esters, ketones, ethers and other liquid (at ambient temperatures) oxidizable organic species are suitable candidates for non-aqueous formulations, especially for piezo applications. It may be desirable that any of the master solvents disclosed herein have a boiling temperature that is higher than water. However, it is contemplated that a master solvent with a boiling temperature that is lower than water may be used.

The liquid functional agent 14 (shown in FIG. 1) also includes the alloying agent. As mentioned above, one example of the alloying agent is an alloying element/elemental metal that alloys (either spontaneously or upon exposure to energy) with the build material 12 to form an alloy 13. Also as mentioned above, another example of the alloying agent is an alloying element precursor that undergoes a reaction(s) to liberate an alloying element/elemental metal, which interacts with the build material 12 to form the alloy 13.

The use of the liquid functional agent 14 to form the alloy 13 allows for the customization of the composition of the 3D printed part 35. For example, the composition of the 3D part 35, 35' may be the pure build material 12 where the liquid functional agent 14 is not applied and the alloy 13 of the build material 12 and the alloying element where the liquid functional agent 14 is applied.

When the alloying agent is present in the liquid functional agent 14 in elemental form (i.e., the alloying agent is the alloying element/elemental metal), liberation is not required. In these examples, the alloying agent can interact directly with the build material 12 to form the alloy 13. In some instances, the alloying agent and build material 12 can spontaneously form the alloy 13 at room temperature. For examples, tin jetted onto bismuth can form an alloy at room temperature, and mercury jetted onto copper can spontaneously alloy. In other instances, the alloying interaction involving the alloying agent and the build material 12 may be initiated by energy applied by the energy source 38. Examples of the alloying agent that to do not require liberation include elemental forms of platinum group metals (i.e., ruthenium, rhodium, palladium, osmium, iridium, and platinum), group 11 elements (i.e., copper, silver, gold), carbon (e.g., carbon black), boron, sulfur, silicon, nickel, tin, and indium. It is to be understood that carbon, boron, bismuth, sulfur, and silicon may be used at ambient conditions in small particle form, in part because they are not easily oxidized in this form.

When the alloying element/elemental metal is to be liberated from the alloying agent, the liberating reaction(s) (e.g., a thermal decomposition reaction and/or a reduction reaction) may generate/produce the alloying element and a gaseous byproduct. Gaseous byproduct(s) may be removed from the system 10 using a flowing purge gas or some other suitable gas removal mechanism. If the byproduct of the liberating reaction is not a gas, the byproduct may contaminate the build material 12 and the resulting 3D printed part 35 may be contaminated with a solid residue. The alloying element/elemental metal may be liberated from the alloying agent by reducing the alloying agent, by thermally decomposing the alloying agent, or by thermally decomposing the alloying agent to produce a thermal decomposition product and then reducing the thermal decomposition product.

When the alloying element is liberated from the alloying agent by reducing the alloying agent, the alloying agent may be a metal oxide. Examples of suitable metal oxides include iron (II) oxide, iron (III) oxide, iron (II, III) oxide, magnesium oxide, chromium (II) oxide, chromium (III) oxide, chromium dioxide, chromium trioxide, chromium (IV) oxide, zinc oxide, cadmium oxide, cobalt (I) oxide, cobalt (II) oxide, cobalt (II, III) oxide, copper (I) oxide, copper (II) oxide, copper peroxide, copper (III) oxide, mercury (I) oxide, mercury (II) oxide, molybdenum dioxide, molybdenum trioxide, nickel (II) oxide, nickel (III) oxide, titanium monoxide, titanium dioxide, dititanium trioxide, aluminum oxide, bismuth (III) oxide, gallium (III) oxide, indium (III) oxide, lead (II) oxide, lead dioxide, lead (II, IV) oxide, tin (II) oxide, tin (IV) oxide, zirconium dioxide, vanadium (II) oxide, vanadium (III) oxide, vanadium (IV) oxide, vanadium (V) oxide, phosphorous (III) oxide, and phosphorous (V) oxide.

When the alloying element is liberated from the alloying agent by thermally decomposing the alloying agent or by thermally decomposing the alloying agent to produce a thermal decomposition product and then reducing the thermal decomposition product, the alloying agent is a thermally decomposing precursor. Examples of thermally decomposing precursors include organic substances (typically carbon precursors, carbonyls, or organometallic compounds of transition metals), dispersions of alloying metal oxide particles, and metal salts that are capable of producing a metal oxide upon thermal decomposition. An example of a suitable carbon precursor is sucrose. Examples of suitable carbonyls include metal carbonyls, such as $Ni(CO_4)$, $Fe(CO_5)$, $Cr(CO)_6$, etc. Examples of suitable organometallic precursors include cyclopentadienyl complexes of transition metals (Co, Fe, Ni, Rh, Zr, Ti, etc.). Examples of suitable metal salts include $Ni(NO_3)_2$, $NiSO_4$, $Ni(SCN)_2$, $Nd(NO_3)_3$, $Co(NO_3)_2$, $CoSO_4$, $Co(SCN)_2$, $Cr(NO_3)_3$, $CrSO_4$, $Bi(NO_3)_3$, $VSO_4$, $VOSO_4$, $Pb(NO_3)_2$, $CuSO_4$, $Cu(NO_3)_2$, $Zr(NO_3)_4$, $ZnSO_4$, $Zn(NO_3)_2$, $Ag(NO_3)_2$, $Y(NO_3)_3$, $NiC_2O_4$, $FeC_2O_4$, etc. The metal salt selected may have decent solubility in the water or the master solvent of the liquid functional agent 14, and thus will not deleteriously affect the viscosity or jetting reliability of the liquid functional agent 14.

The thermally decomposing precursor may be thermally decomposed by heating. The heat may be directly applied by an energy source 38, or it may be heat transferred from the build material 12 which absorbs the energy applied by the energy source 38. It is to be understood that in some examples, the thermal decomposition reaction takes place in an inert or reducing environment so that the thermal decomposing precursor thermally decomposes rather than undergoing an alternate reaction which would fail to liberate the alloying element or the thermal decomposition product (which can then be reduced to liberate the alloying element).

In some examples, the thermally decomposing precursor decomposes directly to the alloying element. In these examples, reduction is not required and the alloying element reacts/alloys directly with the build material 12 to form the alloy 13. The alloying interaction involving the alloying element and the build material 12 may be spontaneous or may be initiated by energy applied by the energy source 38. As such, in some examples, upon exposure to the energy, the thermally decomposing precursor may thermally decompose to produce the alloying element, and the alloying element may react with the build material 12 to form the alloy 13.

Examples of the thermally decomposing precursor that thermally decompose directly to the alloying element without requiring reduction include sucrose, metal carbonyls, metal cyclopentadienyls, metal alkyls, etc.

An example of the thermally decomposing precursor that thermally decomposes directly to the alloying element without requiring reduction includes sucrose. The thermal decomposition of sucrose involves a number of chemical reactions—and one of the predominant reactions may produce carbon and water:

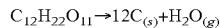

$$C_{12}H_{22}O_{11} \rightarrow 12C_{(s)} + H_2O_{(g)}$$

The water produced by the thermal decomposition of sucrose is in the gas phase at the decomposition temperature. In this example, the carbon produced is the alloying element and is solid at the decomposition temperature. The carbon may then react with the build material 12 to from the alloy 13.

In other examples, the thermally decomposing reactant decomposes to a thermal decomposition product. The thermal decomposition product may need to be reduced to form the alloying element. Examples of thermally decomposing reactants that produce products that require further reduction include the previously listed metal salts, such as, $Ni(NO_3)_2$, $NiSO_4$, $Ni(SCN)_2$, $Nd(NO_3)_3$, $Co(NO_3)_2$, $CoSO_4$, $Co(SCN)_2$, $Cr(NO_3)_3$, $CrSO_4$, $Bi(NO_3)_3$, $VSO_4$, $VOSO_4$, $Pb(NO_3)_2$, $CuSO_4$, $Cu(NO_3)_2$, $Zr(NO_3)_4$, $ZnSO_4$, $Zn(NO_3)_2$, $Ag(NO_3)_2$, $Y(NO_3)_3$, $NiC_2O_4$, and $FeC_2O_4$.

When reduction is required to either liberate the alloying element from the alloying agent or to liberate the alloying element from the thermal decomposition product (which is the decomposition product of the thermally decomposing reactant), reduction can be accomplished by several mechanisms. As one example, reduction can be accomplished by heating the alloying agent or thermal decomposition product in an environment containing a reducing gas. Again, the heat may be directly applied by the energy source 38, or it may be heat transferred from the build material 12 which absorbs the energy applied by the energy source 38. Suitable reducing gases include hydrogen gas, carbon monoxide gas, or inert gases (e.g., argon gas, helium gas, etc.) in combination with a reducing gas.

As another example, reduction can be accomplished by a reducing species that is introduced as a component of the liquid functional agent 14 or as a component of a second liquid functional agent (that is applied to the same portion(s) of the build material 12 as the liquid functional agent 14 containing the alloying agent). The reducing species may be activated by heat (e.g., from the energy source 38 or transferred from the build material 12). Examples of such reducing species include an organic species, such as sugars, aldehydes, etc.

When the reducing species is incorporated into the liquid functional agent 14, it may be present in an amount ranging from about 1 wt % to about 80 wt %. When the reducing species is included in a second liquid functional agent, the second liquid functional agent may include any of previously listed components of the liquid functional agent 14, except the alloying agent.

Once the alloying element has been liberated from the alloying agent or thermal decomposition product, the alloying element interacts with the build material 12 to form the alloy 13. The alloying interaction may be initiated by energy applied by the energy source 38.

The alloying agent may be present in the liquid functional agent 14 in an amount ranging from greater than 0 wt % to about 100 wt % of a total weight percent of the liquid functional agent 14. For example, a piezoelectric printhead may jet a liquid functional agent 14 including 100 wt % of a thermally decomposing reactant. It is believed that the alloying agent loadings may be selected to provide a balance between the liquid functional agent 14 having jetting reliability and alloy formation efficiency. Additionally, the alloying agent selected and the amount of the alloying agent to be incorporated into the liquid functional agent 14 may be based on the alloy to be formed and the build material 12 with which the alloy 13 is to be formed.

Any of the alloying agents that are soluble in the selected vehicle (when a vehicle is used) do not require a dispersing agent.

Any of the alloying agents that are present in the liquid functional agent 14 as solid particles (e.g., carbon black) may include a dispersing species/agent. Examples of suitable dispersing species may be polymer or small molecule dispersants, or other suitable dispersants. Alternatively, dispersing function may be achieved with charged groups attached to the surface of alloying agent. The dispersing agent or charged groups help to uniformly distribute the alloying agent throughout the liquid functional agent 14. Some examples of suitable dispersing agents include a water soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.) or water-soluble styrene-maleic anhydride copolymers/resins. When utilized, the dispersing agent may be present in an amount ranging from about 0.1 wt % to about 20 wt % of the total wt % of the alloying agent.

In examples of the 3D printing method 100 disclosed herein, it is to be understood that one liquid functional agent 14 may be used to alter a composition of the composite layer 34. It is also to be understood that multiple liquid functional agents 14 may be mixed at the same area of build material 12 to alter a composition of the composite layer 34 or multiple liquid functional agents 14 may be applied to different areas of build material 12 (thus forming different composite layers 34) in order to alter a combination of compositions of the composite layers 34.

An example of the 3D printing method 100 is depicted in FIG. 1. As an example, the method 100 may be used to control the physical properties of the 3D part 35 on the voxel level.

Several variations of the method 100 may take place. Generally, the liquid functional agent 14 and the build material 12 are applied, where the liquid functional agent 14 may be applied before the application of the build material 12, after the application of the build material 12, or both before and after the application of the build material 12. Each of these scenarios is depicted in the method 100.

In one example of the method 100, the liquid functional agent 14 is applied below and on the build material 12 before the composite layer 34 is exposed to energy (e.g., reference numerals 102-108). In another example, the liquid functional agent 14 is only applied below the build material 12 before the composite layer 34 is exposed to energy (e.g., reference numerals 102, 104 and 108). In still another example, the liquid functional agent 14 is only applied on the build material 12 before the composite layer 34 is exposed to energy (e.g., reference numerals 104—without the liquid functional agent 14—and 106 and 108).

As shown at reference numeral 108, the composite layer 34 is exposed to energy by using a tightly focused source 38 of energy.

It is to be understood that in examples of the method 100 involving spontaneous, exothermic alloying of the alloying agent and the build material 12, the energy exposure shown at reference numeral 108 may not be performed at all because the heat generated by the exothermic reaction may be sufficient to melt the composite layer 34.

As shown in FIG. 1 at reference numeral 102, one example of the method 100 includes selective applying the liquid functional agent 14, which includes the alloying agent, before the build material 12 is applied. In the example illustrated at reference numeral 102, the liquid functional agent 14 is selectively applied to a build surface 18 before any build material 12 is applied thereto. In other examples (not shown), the liquid functional agent 14 is selectively applied below the build material 12 by selectively applying liquid functional agent 14 to a previously formed layer (e.g., a previously solidified layer of the 3D object 35). When the liquid functional agent 14 is applied, it forms a patterned area on the build surface 18 or on the previously formed layer. As shown at reference numeral 102, the build surface 18 may be the contact surface of a fabrication bed 22.

When the liquid functional agent 14 is applied before the build material 12, it is to be understood that the liquid functional agent 14 may penetrate into the subsequently applied layer of build material 12. The liquid functional agent 14 may completely saturate the subsequently applied layer of build material 12 or may partially penetrate the subsequently applied layer of build material 12. The level of saturation/penetration may depend, at least in part, on the layer thickness, the particle size of the build material 12 particles, and the volume of the liquid functional agent 14 that is applied.

In the example shown at reference numeral 102, applying the liquid functional agent 14 includes the use of the 3D printing system 10. The 3D printing system 10 may include an inkjet applicator 16, a supply bed 20 (including a supply of the build material 12), a delivery piston 26, a spreader 24 (an example of which is the blade shown in FIG. 1), a fabrication bed 22 (having the build surface 18), and a fabrication piston 28. Each of these physical elements may be operatively connected to a central processing unit (i.e., controller, not shown) of the printing system 10. The central processing unit (e.g., running computer readable instructions stored on a non-transitory, tangible computer readable storage medium) manipulates and transforms data represented as physical (electronic) quantities within the printer's registers and memories in order to control the physical elements to create the 3D part 35. The data for the selective delivery of the liquid functional agent 14, the build material 12, etc. may be derived from a model of the 3D part 35 to be formed. For example, the instructions may cause the controller to utilize an applicator (e.g., an inkjet applicator 16) to selectively dispense the liquid functional agent 14, and to utilize a build material distributor to dispense the build material 12. Each of the components of the 3D printing system 10 will be described in more detail throughout the description of the method 100.

The liquid functional agent 14 may be dispensed from any suitable applicator. As illustrated in FIG. 1 at reference number 102, the liquid functional agent 14 may be dispensed from an inkjet printhead 16, such as a thermal inkjet printhead or a piezoelectric inkjet printhead. The printhead 16 may be a drop-on-demand printhead or a continuous drop printhead. The inkjet printhead(s) 16 selectively applies the liquid functional agent 14 on those portions 30 of the build surface 18 or the previously formed layer upon which the composite layer 34 is to be formed. The liquid functional agent 14 is not applied on the portions 32. As such, build material 12 that is applied on those portions 32 of the build surface 18 or the previously formed layer will not be patterned by the applied liquid functional agent 14.

In the example shown at reference numeral 102 in FIG. 1, the liquid functional agent 14 is deposited on less than all of the build surface 18. In other examples (not shown), the liquid functional agent 14 is deposited in different patterns than the one shown in FIG. 1 on less than all of the build surface 18 or on less than all of the previously formed layer. In still other examples (not shown), the liquid functional agent 14 is deposited on all of the build surface 18 or on all of the previously formed layer.

The printhead 16 may be selected to deliver drops of the liquid functional agent 14 at a resolution ranging from about 300 dots per inch (DPI) to about 1200 DPI. In other examples, the printhead 16 may be selected to be able to deliver drops of the liquid functional agent 14 at a higher or lower resolution. The drop velocity may range from about 5 m/s to about 24 m/s and the firing frequency may range from about 1 kHz to about 100 kHz. The printhead 16 may include an array of nozzles through which it is able to selectively eject drops of fluid. In one example, each drop may be in the order of about 5 ng per drop, although it is contemplated that a higher (e.g., 100 ng) or lower (e.g., 1 ng) drop size may be used. In some examples, printhead 16 is able to deliver variable size drops of the liquid functional agent 14.

The inkjet printhead(s) 16 may be attached to a moving XY stage or a translational carriage (neither of which is shown) that moves the inkjet printhead(s) 16 adjacent to the build surface 18 in order to deposit the liquid functional agent 14 in desirable area(s) 30. In other examples, the printhead(s) 16 may be fixed while a support member (supporting the build surface 18) is configured to move relative thereto.

In an example, the printhead(s) 16 may have a length that enables it to span the whole width of the build surface 18 in a page-wide array configuration. As used herein, the term 'width' generally denotes the shortest dimension in the plane parallel to the X and Y axes of the build surface 18, and the term 'length' denotes the longest dimension in this plane. However, it is to be understood that in other examples the term 'width' may be interchangeable with the term 'length'. In an example, the page-wide array configuration is achieved through a suitable arrangement of multiple printheads 16. In another example, the page-wide array configuration is achieved through a single printhead 16. In this other example, the single printhead 16 may include an array of nozzles having a length to enable them to span the width of the build surface 18. This configuration may be desirable for single pass printing. In still other examples, the printhead(s) 16 may have a shorter length that does not enable them to span the whole width of the build surface 18. In these other examples, the printhead(s) 16 may be movable bi-directionally across the width of the build surface 18. This configuration enables selective delivery of the liquid functional agent 14 across the whole width and length of the build surface 18 using multiple passes.

The inkjet printhead(s) 16 may be programmed to receive commands from a central processing unit and to deposit the liquid functional agent 14 according to a pattern of the composite layer 34 to be achieved. In an example, a computer model of the part 35 to be printed is generated using a computer aided design (CAD) program. The computer model of the 3D part 35 is sliced into N layers, which are then divided into voxels. The printing parameters for each voxel are computed based on the desired composition and physical properties of the part 35 to be printed. The printing parameters for each voxel may include the X, Y, and Z coordinates that define its location and the amounts of which liquid functional agents 14 (if any) that are to be received. The central processing unit may then use this information to instruct the inkjet printhead(s) 16 as to how much (if any) of each liquid functional agent 14 should be jetted into each voxel.

After the liquid functional agent 14 is selectively applied in a pattern on the desired portion(s) 30 of the build surface 18 or the previously formed layer, a build material 12 is applied to the build surface 18 or the previously formed layer. When the liquid functional agent 14 is applied to the build surface 18 or the previously formed layer prior to the build material 12 being applied to the build surface 18 or the previously formed layer, the build material 12 and the liquid functional agent 14 combine to form the composite layer 34, as shown at reference numeral 104.

In another example of the 3D printing method 100, the build material 12 may be applied to the build surface 18 or the previously formed layer without the liquid functional agent 14 having been applied to the build surface 18 or the previously formed layer first. In this example, the method 100 begins at step 104, and while the liquid functional agent 14 is shown at the bottom of the build material 12 at reference numerals 104-110, it would not be present. Additionally, in this example of the method 100, the build material 12 does not form the composite layer 34 with the liquid functional agent 14 until the liquid functional agent 14 is applied at reference numeral 106.

The build material 12 may be a metallic material. In an example, the build material 12 may be a powder.

Single elements or alloys may be used as the build material 12. The single element build material may be interacted (e.g., reacted, alloyed, etc.) with one or more other elements to form the alloy 13. The alloy build material is a starting alloy powder, i.e., a combination of elements that acts as a starting point from which the final alloy 13 is created. With an alloy build material, there is a diverse combination of elements that may be used to create a variety of property combinations. For example, a steel build material may be alloyed with carbon to increase strength and hardness. Steel may also be alloyed, for example, with manganese, phosphorus, sulfur, silicon, chromium, nickel, molybdenum, nitrogen, selenium, niobium, tantalum, cobalt, barium, copper, vanadium, zirconium, lead, boron, aluminum, titanium, cobalt, calcium, and/or tungsten.

Some examples of the metallic build material 12 include steels, stainless steel, titanium (Ti) and alloys thereof, aluminum (Al) and alloys thereof, nickel (Ni) and alloys thereof, cobalt (Co) and alloys thereof, iron (Fe) and alloys thereof, nickel cobalt (NiCo) alloys, gold (Au) and alloys thereof, silver (Ag) and alloys thereof, platinum (Pt) and alloys thereof, and copper (Cu) and alloys thereof. Some specific examples include AlSi10Mg, CoCr MP1, CoCr SP2, MaragingSteel MS1, NickelAlloy HX, Inconel IN625, Inconel IN718, SS GP1, SS 17-4PH, SS 316L, Ti6Al4V, and Ti-6Al-4V ELI7. While several example alloys have been provided, it is to be understood that other alloy build materials may be used.

The metal or metal alloy build material 12 may have a melting point ranging from about 100° C. to about 3500° C.

The build material 12 may be made up of similarly sized particles or differently sized particles. In the examples shown herein, the build material 12 includes similarly sized particles. The term "size", as used herein with regard to the build material 12, refers to the diameter of a substantially spherical particle (i.e., a spherical or near-spherical particle having a sphericity of >0.84), or the average diameter of a non-spherical particle (i.e., the average of multiple diameters across the particle). The average particle size of the particles of the build material 12 may be greater than 1 μm and may be up to about 500 μm. Substantially spherical particles of this particle size have good flowability and can be spread relatively easily. As another example, the average size of the particles of the build material 12 ranges from about 10 μm to about 200 μm. As still another example, the average size of the particles of the build material 12 ranges from 20 μm to about 60 μm.

As mentioned above, the 3D printing system 10 may include the supply bed 20, the delivery piston 26, the spreader 24, the fabrication bed 22, and the fabrication piston 28. The delivery piston 26 and the fabrication piston 28 may be the same type of piston, but are programmed to move in opposite directions. In an example, when a layer of the 3D part 35 is to be formed, the delivery piston 26 may be programmed to push a predetermined amount of the build material 12 out of the opening in the supply bed 20 and the fabrication piston 28 may be programmed to move in the opposite direction of the delivery piston 26 in order to increase the depth of the fabrication bed 22. The delivery piston 26 will advance enough so that when the spreader 24 pushes the build material 12 into the fabrication bed 22 and onto the build surface 18 or the previously formed layer, the depth of the fabrication bed 22 is sufficient so that a composite layer 34 of the build material 12 and the liquid functional agent 14 may be formed in the fabrication bed 22. The spreader 24 is capable of spreading the build material 12 into the fabrication bed 22 to form a build material layer, which is relatively uniform in thickness. In an example, the thickness of the build material layer ranges from about 30 μm to about 70 μm, although thinner or thicker layers may also be used. For example, the thickness of the layer may range from about 50 μm to about 1000 μm. Depending upon the desired thickness for the layer and the particle size of the build material 12, the layer that is formed in a single build material application may be made up of a single row of build material particles 12 or several rows of build material particles 12 (as shown at reference numeral 102).

It is to be understood that the spreader 24 may be a rigid or flexible blade, which is a more common spreader for metal/metal alloy build materials. However, the spreader may also be replaced by other tools, such as a roller, or a combination of a roller and a blade.

The supply bed 20 that is shown is one example, and could be replaced with another suitable delivery system to supply the build material 12 to the fabrication bed 22. Examples of other suitable delivery systems include a hopper, an auger conveyer, or the like.

The fabrication bed 22 that is shown is also one example, and could be replaced with another support member, such as a platen, a print bed, a glass plate, or another build surface.

In one example of the method 100, after the build material 12 is applied, as shown in FIG. 1 at reference numeral 104, the liquid functional agent 14 may be selectively applied to the build material 12, as shown at reference number 106. As illustrated at reference numeral 106, the liquid functional agent 14 may be selectively applied to the build material 12 by the inkjet printhead 16.

When the liquid functional agent 14 is applied on the build material 12, it is to be understood that the liquid functional agent 14 may reside at the top of the layer 34, may completely saturate the layer 34, or may partially penetrate the layer 34. The level of saturation/penetration may depend, at least in part, on the layer thickness, the particle size of the build material 12 particles, and the volume of the liquid functional agent 14 that is applied.

It is to be understood that when the same liquid functional agent 14 is applied both below and on the build material 12, it may be applied in the same pattern or in a different pattern. When multiple liquid functional agents 14 are used, they may be applied in the same pattern or different patterns, which may be above and/or below the build material 12.

It is also to be understood that in some examples of the method 100, the liquid functional agent 14 is applied before the build material 12 is applied (and thus penetrates a lower portion of the applied build material 12) and is not applied after the build material 12 is applied (i.e., is not applied on the build material 12). In these examples, the method 100 proceeds from reference numeral 104 to reference numeral 108.

In some examples of the 3D printing method 100, the composite layer 34 is exposed to a reducing species (not shown). As previously described, the reducing species may be used to liberate the alloying element from the alloying agent or from the thermal decomposition product through a reduction reaction. The reduction reaction may be initiated by exposing the composite layer 34 (which includes the alloying agent or the thermal decomposition product (obtained by thermally decomposing the alloying agent)) to both the reducing species and heat.

The composite layer 34 may be exposed to the reducing species by introducing a reducing gas through an environment in which the reaction takes place. For example, the reducing gas may be hydrogen gas or carbon monoxide gas or a combination of one of these gases with an inert gas, in the environment around the fabrication bed 22. The composite layer 34 may also be exposed to the reducing species through the liquid functional agent 14 (which contains the species) or through a second liquid functional agent (which contains the species, but not the alloying agent). In the latter instances, the reducing species may be activated when exposed to heat. As such, when the energy source 38 is used to heat the build material 12, the reducing species may be activated and may react to reduce the alloying agent or the thermal decomposition product to produce the alloying element.

After the liquid functional agent 14 is selectively applied below, on, or below and on the build material 12, and, in some instances, after the composite layer 34 is exposed to a reducing species, the composite layer 34 may be exposed to energy. Energy exposure is shown at reference numeral 108.

As shown in FIG. 1 at reference numeral 108, the energy source may be a tightly focused energy source 38 such as a laser, electron beam or microwave tip emitter. As illustrated at reference numeral 108, an energy beam 42 may be applied using the tightly focused energy source 38 and scanner system 40. The scanning system 40 allows the energy beam 42 to be selectively applied to the composite layer 34 and/or unpatterned portions 32 of the build material 12. While a single tightly focused energy source 38 is shown at reference numeral 108, it is to be understood that multiple tightly focused energy sources 38 may be used.

The tightly focused energy source 38 and the scanning system 40 may be attached to a moving XY stage or a translational carriage (neither of which is shown) that moves them adjacent to the fabrication bed 22 in order to direct the energy beam 42 in desirable area(s). In other examples, the tightly focused energy source 38 and the scanning system 40 may be fixed while a support member (similar to the fabrication bed 22) is configured to move relative thereto.

The tightly focused energy source 38 and the scanning system 40 may be programmed to receive commands from the central processing unit and to expose the composite layer 34 (including the liquid functional agent(s) 14 and the build material 12) and/or unpatterned portions 32 of the build material 12 to energy.

The energy exposure time may be dependent on the characteristics of the energy source 38 chosen, the characteristics of the liquid functional agent(s) 14 used and/or the characteristics of the build material 12.

Exposing the composite layer 34 and/or unpatterned portions 32 of the build material 12 to energy may cause melting of the build material particles 12 to take place. The build material 12 may absorb thermal energy or may convert radiation to thermal energy. The energy from the source 38 may be sufficient to elevate the temperature of the build material 12 above the melting point of the build material 12.

As shown in FIG. 1, the portions of the build material 12 that are exposed to energy melt. When the tightly focused energy source 38 is used (shown at reference numeral 108), all of the build material 12 that is exposed to energy from the tightly focused energy source 38 melts. In the example shown at reference numeral 108 in FIG. 1, the tightly focused energy source 38 exposes all of the composite layer 34 to energy and does not expose the unpatterned portions 32 to energy. In other examples, the tightly focused energy source 38 may expose less than all of the composite layer 34 to energy and/or expose some or all of the unpatterned portions 32 to energy. In these examples, less than all of the composite layer 34 and/or some or all of the unpatterned portions 32 melt to form the layer of the 3D printed part 35.

Additionally, the liberation reaction(s) (e.g., the thermal decomposition reaction and/or the reduction reaction) and/or the alloying interaction(s) may be exothermic reactions or endothermic reactions that control the heating and cooling rates of the build material 12. When the reaction is an exothermic reaction, it may provide additional thermal energy needed to heat (e.g., super heat) the build material 12 to a temperature necessary to achieve the desired cooling rate, microstructure, and physical properties (e.g., structural integrity). When the reaction is an endothermic reaction, it may affect the cooling rate, and therefore, the microstructure and physical properties (e.g., structural integrity) of the 3D printed part 35.

In at least some of the examples of the method 100 disclosed herein, exposing the composite layer 34 to energy also initiates at least one interaction involving the alloying agent and/or a reaction product of the reaction involving the alloying agent.

In one example, the alloying agent may be an alloying element that interacts with the build material 12 to form the alloy 13. For example, when the alloying agent is carbon black and the build material 12 is iron, the alloying agent can perform three actions. The alloying agent can act as a solute and be dissolved in the ferrite phase of iron as a solid solution. If the carbon concentration exceeds the maximum concentration for the solid solution of carbon in ferrite, an iron carbide phase precipitates according to the following reaction (I):

$$C + Fe \rightarrow Fe_xC_y \tag{I}$$

to produce a 2 phase Fe—$Fe_xC_y$ alloy. The most common $Fe_xC_y$ phase is $Fe_3C$, also known as cementite, although other stoichiometries may occur. It is also possible under rapid cooling conditions to suppress the formation of the $Fe_xC_y$ in a supersaturated ferrite and form a phase called martensite.

In another example, the alloying element is liberated from the alloying agent through a reduction reaction that generates the alloying element and a gaseous byproduct. As an example, when the alloying agent is nickel (II) oxide, exposure to energy and a reducing species (e.g., hydrogen or CO) may initiate the following reactions (II) or (III):

$$NiO + H_2 \rightarrow Ni_{(s)} + H_2O_{(g)} \tag{II}$$

$$NiO + CO \rightarrow Ni_{(s)} + CO_{2(g)} \tag{III}$$

to produce solid nickel (the alloying element) and $H_2O$ or $CO_2$ gas. When the build material 12 is iron, exposure to energy may initiate an alloying interaction between the nickel alloying element and the iron build material 12 to produce a Fe—Ni alloy.

In still another example, the alloying element is liberated from a thermally decomposing precursor through a decomposition reaction that generates the alloying element and a gaseous byproduct or a thermal decomposition product and a gaseous byproduct. As an example, when the alloying agent is sucrose, exposure to energy may initiate the following reaction (IV):

$$C_{12}H_{22}O_{11} \rightarrow 12C_{(s)} + H_2O_{(g)} \tag{IV}$$

to produce solid carbon (the alloying element) and water vaper. Thermal decomposition of sucrose may also produce several different organic species with reducing properties. When the build material 12 is iron, exposure to energy may initiate an alloying reaction similar to reaction (I), to produce a Fe—C alloy. When the decomposition reaction generates a thermal decomposition product and a gaseous byproduct, exposure to energy may initiate a reduction reaction similar to reaction (II) or (III), and further exposure to energy may initiate an alloying reaction similar to reaction (I), to produce the alloy 13.

As shown in FIG. 1, the layer of the 3D part 35 is formed at the portions of the build material 12 that are exposed to energy and upon which the liquid functional agent 14 is deposited to form the alloy 13. The liquid functional agent(s) 14 and the amounts of those liquid functional agent(s) 14 jetted into each voxel determine the interactions, reactions, etc. that will occur and the type of alloy 13 that will be formed in each voxel. The physical and/or chemical reactions that occur in each voxel determine the composition of each voxel, which in turn, along with the alloys 13 formed, determines the physical properties of the 3D part 35.

In the example of the 3D printing method 100 shown in FIG. 1, additional layers of the 3D part 35 may be formed by repeating reference numerals 102-108; 102, 104 and 108; or 102, 106 and 108. For example, to form an additional layer of the 3D part 35, the liquid functional agent 14 may be selectively applied to the previously formed layer, an additional layer of the build material 12 may be applied to the previously formed layer to form an additional composite layer, the liquid functional agent 14 may be selectively applied to the additional composite layer, and the additional composite layer may be exposed to energy to form that additional layer. In other examples, additional layers may be formed by depositing the liquid functional agent 14 only below or only on the additional layer of the build material 12 to form the additional composite layer. Any number of additional layers may be formed.

Figure 2:
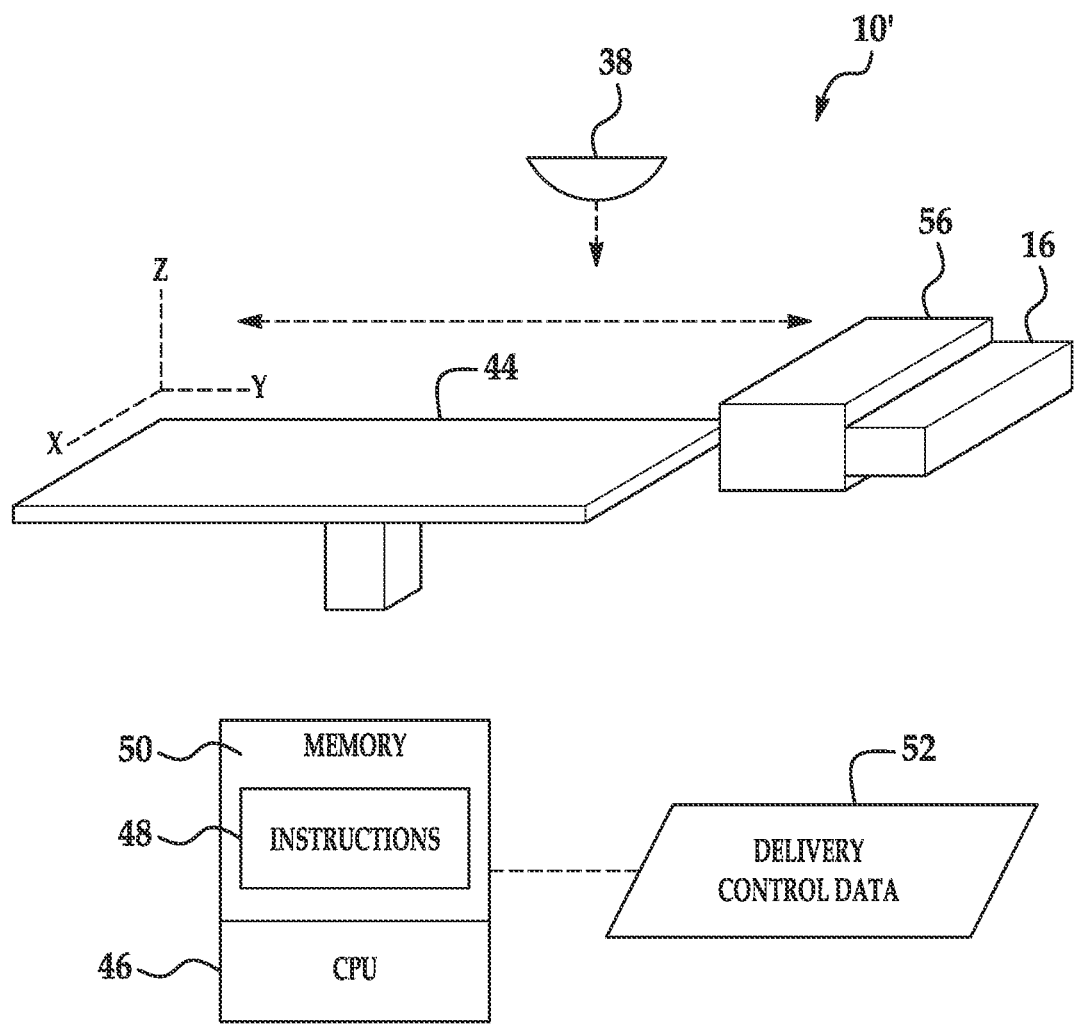
FIG. 2 is a simplified isometric view of an example of a 3D printing system disclosed herein.

Referring now to FIG. 2, another example of the printing system 10' is depicted. The system 10' includes a central processing unit 46 that controls the general operation of the additive printing system 10'. As an example, the central processing unit 46 may be a microprocessor-based controller that is coupled to a memory 50, for example via a communications bus (not shown). The memory 50 stores the computer readable instructions 48. The central processing unit 46 may execute the instructions 48, and thus may control operation of the system 10' in accordance with the instructions 48. For example, the instructions 48 may cause the controller to utilize a liquid functional agent distributor 16 (e.g., an inkjet applicator 16) to selectively dispense the liquid functional agent 14, and to utilize a build material distributor 56 to dispense the build material 12 to form a three-dimensional part 35.

In this example, the printing system 10' includes a liquid functional agent distributor 16 to selectively deliver the liquid functional agent 14 to portion(s) 30 below and/or on the layer (not shown in this figure) of build material 12 provided on a support member 44.

The central processing unit 46 controls the selective delivery of the liquid functional agent 14 to the layer of the build material 12 in accordance with delivery control data 52.

In the example shown in FIG. 2, it is to be understood that the distributor 16 is a printhead(s), such as a thermal inkjet printhead(s) or a piezoelectric inkjet printhead(s). The printhead(s) 16 may be a drop-on-demand printhead(s) or a continuous drop printhead(s).

The printhead(s) 16 may be used to selectively deliver the liquid functional agent 14, when in the form of a suitable fluid. As described above, the liquid functional agent 14 may include a non-aqueous vehicle or an aqueous vehicle, such as water, co-solvent(s), surfactant(s), etc., to enable it to be delivered via the printhead(s) 16. The liquid functional agent 14 may be selectively dispensed before, after, or both before and after the build material 12 to pattern the build material 12 and form a composite layer 34.

In one example, the printhead(s) 16 may be selected to deliver drops of the liquid functional agent 14 at a resolution ranging from about 300 dots per inch (DPI) to about 1200 DPI. In other examples, the printhead(s) 16 may be selected to be able to deliver drops of the liquid functional agent 14 at a higher or lower resolution. The drop velocity may range from about 5 m/s to about 24 m/s and the firing frequency may range from about 1 kHz to about 100 kHz.

The printhead(s) 16 may include an array of nozzles through which the printhead(s) 16 is able to selectively eject drops of fluid. In one example, each drop may be in the order of about 5 ng per drop, although it is contemplated that a higher (e.g., 100 ng) or lower (e.g., 1 ng) drop size may be used. In some examples, printhead(s) 16 is able to deliver variable size drops.

The printhead(s) 16 may be an integral part of the printing system 10', or it may be user replaceable. When the printhead(s) 16 is user replaceable, they may be removably insertable into a suitable distributor receiver or interface module (not shown).

As shown in FIG. 2, the distributor 16 may have a length that enables it to span the whole width of the support member 44 in a page-wide array configuration. In an example, the page-wide array configuration is achieved through a suitable arrangement of multiple printheads. In another example, the page-wide array configuration is achieved through a single printhead with an array of nozzles having a length to enable them to span the width of the support member 44. In other examples of the printing system 10', the distributor 16 may have a shorter length that does not enable it to span the whole width of the support member 44.

While not shown in FIG. 2, it is to be understood that the distributor 16 may be mounted on a moveable carriage to enable it to move bi-directionally across the length of the support member 44 along the illustrated y-axis. This enables selective delivery of the liquid functional agent 14 across the whole width and length of the support member 44 in a single pass. In other examples, the distributor 16 may be fixed while the support member 44 is configured to move relative thereto.

As used herein, the term 'width' generally denotes the shortest dimension in the plane parallel to the X and Y axes shown in FIG. 2, and the term 'length' denotes the longest dimension in this plane. However, it is to be understood that in other examples the term 'width' may be interchangeable with the term 'length'. As an example, the distributor 16 may have a length that enables it to span the whole length of the support member 44 while the moveable carriage may move bi-directionally across the width of the support member 44.

In examples in which the distributor 16 has a shorter length that does not enable it to span the whole width of the support member 44, the distributor 16 may also be movable bi-directionally across the width of the support member 44 in the illustrated X axis. This configuration enables selective delivery of the liquid functional agent 14 across the whole width and length of the support member 44 using multiple passes.

The distributor 16 may include therein a supply of the liquid functional agent 14 or may be operatively connected to a separate supply of the liquid functional agent 14.

As shown in FIG. 2, the printing system 10' also includes a build material distributor 56. This distributor 56 is used to provide the layer of the build material 12 on the support member 44. Suitable build material distributors 56 may include, for example, any spreader, such as a wiper blade, a roller, or combinations thereof.

The build material 12 may be supplied to the build material distributor 56 from a hopper, auger, or other suitable delivery system. In the example shown, the build material distributor 56 moves across the length (Y axis) of the support member 44 to deposit a layer of the build material 12. As previously described, a first layer of build material 12 will be deposited on the support member 44, whereas subsequent layers of the build material 12 will be deposited on a previously deposited (and solidified) layer.

It is to be further understood that the support member 44 may also be moveable along the Z axis. In an example, the support member 44 is moved in the Z direction such that as new layers of build material 12 are deposited, a predetermined gap is maintained between the surface of the most recently formed layer and the lower surface of the distributor 16. In other examples, however, the support member 44 may be fixed along the Z axis and the distributor 16 may be movable along the Z axis.

Similar to the system 10 (shown in FIG. 1), the system 10' also includes the tightly focused energy source 38 to apply energy to the deposited layer of build material 12 and the liquid functional agent 14 to cause the solidification of portion(s) of the build material 12. The tightly focused energy source 38 may also initiate at least one interaction involving the alloying agent and/or a reaction product of the reaction involving the alloying agent. In these examples, the interaction(s) involving the alloying agent and/or reaction products result in the formation of the alloy 13. Any of the previously described tightly focused energy sources 38 may be used.

While not shown, it is to be understood that the tightly focused energy source 38 may be mounted on the moveable carriage or may be in a fixed position.

The central processing unit 46 may control the tightly focused energy source 38. The amount of energy applied may be in accordance with delivery control data 52.

While not shown, the system 10' may also include a reducing species to aid in the reduction of the alloying agent or the thermal decomposition product. The reducing species may be in the ambient environment around the system 10' or in the liquid functional agent 14 or in the second liquid functional agent.

To further illustrate the present disclosure, prophetic examples are given herein. It is to be understood that this example is provided for illustrative purposes and is not to be construed as limiting the scope of the present disclosure.

PROPHETIC EXAMPLES

Prophetic Example 1

An example of the liquid functional agent is prepared. The alloying agent used in the example liquid functional agent is carbon black in the form of a CAB-O-JET® 300 CB dispersion. The formulation of the example liquid functional agent is provided in Table 1, with the wt % of each component that is used. The weight percentage of the CAB-O-JET® 300 CB dispersion represents the total dispersion (active and non-active components) present in the final formulation.

TABLE 1

| Components | Actives wt % | Target wt % | Formulation wt % |
| --- | --- | --- | --- |
| 1-(2-Hydroxyethyl)-2-Pyrrolidone (HE-2P) | 100.00% | 13.20% | 13.200% |
| 1,2-Hexanediol | 100.00% | 10.00% | 10.00% |
| CAB-O-JET ® 300 CB dispersion | 15.00% | 8.00% | 53.33% |
| SURFYNOL ® 104 (2 wt % in HE-2P) | 10.00% | 0.40% | 4.00% |
| Water | | | 19.47% |
| Total | | | 100.00% |

The example liquid functional agent is dispensed using an inkjet printhead onto an unfused powder bed composed of iron powder as the build material. The build material with the example liquid functional agent dispensed thereon is heated to a temperature greater than 1538° C. The iron powder melts and a Fe—C alloy is formed from the carbon black and the iron build material where the example liquid functional agent is applied.

Prophetic Example 2

A second example liquid functional agent is prepared. The alloying agent used in the second example liquid functional agent is sucrose. The formulation of the second example liquid functional agent is provided in Table 2.

TABLE 2

| Components | Formulation wt % |
|---|---|
| 2-Pyrrolidone | 17.00% |
| Sucrose | 30.00% |
| ACTICIDE ® M20 (Stock Solution) | 0.10% |
| TERGITOL ® 15-S-7 | 0.56% |
| Water | 52.34% |
| Total | 100.00% |

The second example liquid functional agent is dispensed using an inkjet printhead onto an unfused powder bed composed of iron powder as the build material. The build material with the second example liquid functional agent dispensed thereon is heated to a temperature greater than 1538° C. in an argon gas environment. The iron powder melts, carbon is liberated from the sucrose according to the following thermal decomposition reaction:

$$C_{12}H_{22}O_{11} \rightarrow 12C_{(s)}H_2O_{(g)}$$ 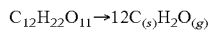

and a Fe—C alloy is formed from the liberated carbon and the iron build material where the example liquid functional agent is applied.

Prophetic Example 3

Duplex stainless steel is a type of steel is characterized by having a microstructure consisting of 2 phases, austenite and ferrite. A purely austenitic stainless steel is softer, more ductile and has higher fracture toughness. A ferritic stainless steel is harder and stronger, but has a lower ductility and fracture toughness. A duplex stainless steel can be created that has a good balance of hardness, strength toughness and ductility by creating a steel that is composed of a 2 phase mixture of austenite and ferrite.

A duplex stainless steel with customized properties is created by starting with an Fe—Cr—Mo alloy powder as the build material. The Cr and Mo impart corrosion resistance and are also ferrite stabilizers. As such, the starting powder will be in, and produce a solid having the ferritic phase. The formation of the austenitic phase is promoted through the addition of nickel (1 wt % to 11 wt %) and/or of nitrogen (0.1 wt % to 0.4 wt %). Nitrogen also acts as an interstitial hardener, so it may be more desirable to stabilize austenite using nickel. The nickel is introduced to the Fe—Cr—Mo alloy powder through the liquid functional agent, which includes nickel (II) oxide. The liquid functional agent is deposited on the Fe—Cr—Mo alloy powder and is exposed to energy and a reducing species (e.g., hydrogen or CO).

This reduces the nickel (II) oxide to form the nickel, which alloys with the Fe—Cr—Mo alloy powder in contact therewith to form the austenitic phase.

In the examples disclosed herein, the selective application of the alloying agent enables the customization of 3D part properties, such as strength, hardness, ductility, toughness, etc., depending on the requirements of 3D part and/or the application in which the 3D part will be used.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from greater than 1 μm and up to about 500 μm should be interpreted to include the explicitly recited limits of greater than 1 μm to 500 μm, as well as individual values, such as 50 μm, 125 μm, 300.5 μm, 495 μm, etc., and sub-ranges, such as from about 35 μm to about 375 μm, from about 60 μm to about 225 μm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:
1. A three-dimensional (3D) printing system, comprising:
a supply bed including a supply of a metallic build material;
a build material distributor;
an inkjet applicator including a supply of a liquid functional agent and to selectively dispense the liquid functional agent, the liquid functional agent including a vehicle and an alloying agent selected from the group consisting of an alloying element that interacts with a metallic build material to form an alloy, a metal oxide that reduces to form the alloying element, and a thermally decomposing precursor that liberates the alloying element, wherein the thermally decomposing precursor is selected from the group consisting of sucrose, a metal carbonyl, an organometallic compound of a transition metal, and a dispersion of alloying metal oxide particles;
a controller;
a non-transitory computer readable medium having stored thereon computer executable instructions to cause the controller to:
utilize the build material distributor to dispense the metallic build material; and
utilize the applicator to selectively dispense the liquid functional agent after the dispensing of the metallic build material to pattern the metallic build material and form a composite layer; and
an energy source to expose at least some of the metallic build material to energy to melt the at least some of the metallic build material to form a layer;

wherein upon contact or after energy exposure, the alloying agent and the build material alter a composition of the composite layer.

2. The 3D printing system as defined in claim 1, wherein the alloying agent is the metal oxide that reduces to form the alloying element, and wherein the alloying element is an elemental metal.

3. The 3D printing system as defined in claim 2, further comprising:
   a fabrication bed to receive the metallic build material; and
   a reducing gas or an inert gas in combination with the reducing gas that is to be introduced into an environment around the fabrication bed, wherein the reducing gas is selected from the group consisting of hydrogen gas and carbon monoxide gas.

4. The 3D printing system as defined in claim 2, further comprising:
   a supply of a second liquid functional agent including a reducing species selected from the group consisting of a sugar and an aldehyde; and
   an inkjet applicator for selectively dispensing the second liquid functional agent.

5. The 3D printing system as defined in claim 2, wherein:
   the metal oxide is selected from the group consisting of iron (II) oxide, iron (III) oxide, iron (II, III) oxide, magnesium oxide, chromium (II) oxide, chromium (III) oxide, chromium dioxide, chromium trioxide, chromium (IV) oxide, zinc oxide, cadmium oxide, cobalt (I) oxide, cobalt (II) oxide, cobalt (II, III) oxide, copper (I) oxide, copper (II) oxide, copper peroxide, copper (III) oxide, mercury (I) oxide, mercury (II) oxide, molybdenum dioxide, molybdenum trioxide, nickel (II) oxide, nickel (III) oxide, titanium monoxide, titanium dioxide, dititanium trioxide, aluminum oxide, bismuth (III) oxide, gallium (III) oxide, indium (III) oxide, lead (II) oxide, lead dioxide, lead (II, IV) oxide, tin (II) oxide, tin (IV) oxide, zirconium dioxide, vanadium (II) oxide, vanadium (III) oxide, vanadium (IV) oxide, vanadium (V) oxide, phosphorous (III) oxide, and phosphorous (V) oxide.

6. The 3D printing system as defined in claim 5, wherein the thermally decomposing precursor is the metal carbonyl, and the metal carbonyl is selected from the group consisting of $Ni(CO_4)$, $Fe(CO_5)$, and $Cr(CO)_6$.

7. The 3D printing system as defined in claim 1, wherein the thermally decomposing precursor is the organometallic compound of the transition metal, and the organometallic compound of the transition metal is a cyclopentadienyl complex of a transition metal selected from the group consisting of Co, Fe, Ni, Rh, Zr, and Ti.

8. The 3D printing system as defined in claim 1, wherein the alloying agent is the alloying element that interacts with the metallic build material to form the alloy; and
   the alloying element is selected from the group consisting of ruthenium, rhodium, palladium, osmium, iridium, platinum, copper, silver, gold, carbon, boron, sulfur, silicon, nickel, tin, and indium.

* * * * *